(12) United States Patent
Sonnenberg

(10) Patent No.: US 10,337,896 B2
(45) Date of Patent: Jul. 2, 2019

(54) ULTRASONIC METER

(71) Applicant: DIEHL METERING GMBH, Ansbach (DE)

(72) Inventor: Hans-Michael Sonnenberg, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 35 days.

(21) Appl. No.: 15/813,778

(22) Filed: Nov. 15, 2017

(65) Prior Publication Data

US 2018/0136024 A1    May 17, 2018

(30) Foreign Application Priority Data

Nov. 15, 2016  (DE) .......................... 10 2016 013 607

(51) Int. Cl.
*G01F 1/66*  (2006.01)
*G01F 15/00*  (2006.01)

(52) U.S. Cl.
CPC .............. *G01F 1/662* (2013.01); *G01F 15/00* (2013.01)

(58) Field of Classification Search
CPC .............. G01F 1/66; G01F 15/00; G01F 1/64
See application file for complete search history.

(56) References Cited

U.S. PATENT DOCUMENTS

| | | | | |
|---|---|---|---|---|
| 7,610,817 B2 * | 11/2009 | Igarashi | .................... | F15D 1/00 73/861.52 |
| 7,610,818 B2 * | 11/2009 | Sanders | .................... | G01F 1/44 73/861.63 |
| 10,072,958 B2 * | 9/2018 | Betz | .......................... | G01F 1/44 |
| 2004/0194554 A1 * | 10/2004 | Nestle | ....................... | G01F 1/36 73/861.49 |
| 2006/0288798 A1 | 12/2006 | Kroemer et al. | | |
| 2009/0100940 A1 | 4/2009 | Strunz et al. | | |
| 2017/0211956 A1 | 7/2017 | Drachmann | | |

FOREIGN PATENT DOCUMENTS

| | | |
|---|---|---|
| EP | 0565851 A1 | 10/1993 |
| EP | 1701140 A1 | 9/2006 |
| WO | 2016012024 A1 | 1/2016 |
| WO | 2016206773 A1 | 12/2016 |

* cited by examiner

*Primary Examiner* — Jewel V Dowtin
(74) *Attorney, Agent, or Firm* — Laurence A. Greenberg; Werner H. Stemer; Ralph E. Locher

(57) ABSTRACT

An ultrasonic meter detects a flow rate of a fluid. The ultrasonic meter has a fluid inlet, a fluid outlet and a flow passage connecting the fluid inlet to the fluid outlet. The flow passage has a measuring tube, which extends in a straight line in a flow direction. An inner wall of a side wall delimiting a flow cross section of the measuring tube has at least one groove, extending in the flow direction, which enlarges the flow cross section. The side wall has an aperture and/or a step exclusively within the groove, between a normal region and a recessed region in the flow direction. A groove depth of the groove is greater in the recessed region than in the normal region.

21 Claims, 5 Drawing Sheets

ULTRASONIC METER

CROSS-REFERENCE TO RELATED APPLICATION

This application claims the benefit, under 35 U.S.C. § 119, of German patent application DE 10 2016 013 607.3, filed Nov. 15, 2016; the prior application is herewith incorporated by reference in its entirety.

BACKGROUND OF THE INVENTION

Field of the Invention

The invention relates to an ultrasonic meter for detecting a flow rate of a fluid, and having a fluid inlet, a fluid outlet and a flow passage connecting the fluid inlet to the fluid outlet. The flow passage has a measuring tube which extends in a straight line in a flow direction.

Ultrasonic meters for detecting flow rates of fluids, e.g. of liquids or gases, especially water, should allow as precise as possible detection of the flow rate, even when the flow is highly dynamic. In particular, detection of the flow rate should be robust in relation to internal and external disturbances. Stabilization of the flow in the measurement zone is essential here. In particular, a sudden change in the disturbance, e.g. at a particular flow rate, should be avoided since such a change can lead to a change in the measurement curve. Since the changeover point can be dependent on a large number of factors, e.g. on the temperature and a state of ageing of the ultrasonic meter, reliable compensation of such a change is virtually impossible.

One possibility of reducing or preventing sudden changes in the flow is to introduce turbulence into the flow before entry to a measuring tube. For this purpose, published European patent application EP 0 565 851 A1 proposes to guide the flow to the measuring tube substantially perpendicularly to the direction of flow through the measuring tube and to provide webs in a zone of influence of the measuring tube, which extend the measuring tube and by which turbulence is introduced into these flows.

SUMMARY OF THE INVENTION

It is the underlying object of the invention to further improve flow guidance in the region of a measuring tube of the ultrasonic meter in order to satisfy high standards in respect of the measurement accuracy and dynamics of measurement.

According to the invention, the object is achieved by an ultrasonic meter of the type stated at the outset, wherein an inner wall of a side wall delimiting a flow cross section of the measuring tube has at least one groove, extending in the flow direction, which enlarges the flow cross section. The side wall has an aperture and/or a step exclusively within the groove, between a normal region and a recessed region in the flow direction, wherein a groove depth of the groove is greater in the recessed region than in the normal region.

According to the invention, a measuring tube, the side wall of which has a plurality of grooves in the circumferential direction with raised regions between them, is used instead of a measuring tube that has a substantially circular flow cross section, for example. The grooves can be trapeziform or the inner surface of the side wall can have a trapezium profile. It is also possible for edges in a profile of this kind to be rounded. The profile of the inner surface can also be undulating. It has been recognized that a corresponding shape of the side wall can contribute to stabilization of the flow profile in the measuring tube. In many cases, it would be advantageous for optimum flow guidance to use a large groove depth of the grooves or to reduce the width of these grooves to the greatest possible extent. At the same time, the flow cross section of the measuring tube should not be reduced too much so as to keep down the pressure drop across the measuring tube. As a result, the groove depth is limited by the available installation space. Moreover, the width of the grooves cannot be reduced too much since, otherwise, it is possible for suspended matter to settle in these grooves, for example, and thus contaminate them. In order nevertheless to achieve the best possible stabilization of the flow profile, despite these given design limits, the invention specifies that at least one of the grooves should be modified by providing an aperture in the side wall or a step leading to a recessed region. The depth of the grooves is thereby locally increased, thereby making it possible to further stabilize flow guidance. In the case of the aperture, the groove depth is increased at least by the wall thickness of the measuring tube if the measuring tube rests flush against a housing of the ultrasonic meter or some other component of the ultrasonic meter, e.g. in the region of the aperture. As will be explained in detail below, it is also possible for the aperture to end in a fluid-filled exchange volume, which is fluidically connected to the fluid outlet, for example. The effective result is a further increase in the groove depth since the flow can be guided partially through the exchange volume.

According to the invention, no steps or apertures are provided in the raised regions. The distance between a center line of the measuring tube and the side wall in the respective raised region can be constant in the case of a substantially circular flow profile or can vary continuously in the flow direction, e.g. in order to form a slightly conical shape of the measuring tube. The change in the flow cross section in the flow direction can be such that a gradient of less than 2°, in particular a gradient of between 0.5° and 2° or between 0.7° and 1° is achieved. The aperture or recessed region can be slot-shaped. In particular, the extent of the aperture or recessed region can be greater in the flow direction than in the circumferential direction of the measuring tube. In the ultrasonic meter according to the invention, it is possible for each of the grooves to have an aperture and/or a step leading to a recessed region. The apertures or recessed regions can extend over the same measuring tube segment in the flow direction in the case of all the grooves.

The changeover between the raised regions situated between the grooves and the grooves in the circumferential direction of the measuring tube can preferably take place periodically. The various raised regions and grooves can each be of identical design to one another or differ from one another. For example, the depth of the various grooves can differ.

The ultrasonic meter according to the invention can be configured in such a way that the flow passage is formed by a tubular housing of the ultrasonic meter. The measuring tube can be inserted into this housing in such a way that fluid exchange between the fluid inlet and the fluid outlet within the ultrasonic meter is possible exclusively via the measuring tube. The flow rate can be detected by sending an ultrasound signal through the measuring tube substantially parallel to the flow direction. The flow rate can be determined in accordance with a frequency shift and/or a propagation time of this ultrasound signal. Such methods are known in the prior art and will not be described in detail. To transmit and receive the ultrasound signal, use can be made of ultrasonic transducers which are arranged in a side wall of the housing and which transmit or receive the ultrasound signal substantially perpendicularly to the flow direction. To deflect the ultrasound signal, respective reflection elements that deflect the ultrasound signal can be provided on the fluid inlet side and/or the fluid outlet side of the measuring tube. These can be secured on the housing and/or on the measuring tube, in particular by means of associated holding elements, or can be formed integrally with the housing or measuring tube.

The inner wall can have a plurality of grooves, wherein one of the grooves has the aperture and/or the step or wherein a plurality of the grooves has a respective aperture and/or a respective step.

The grooves can each have a level or circular-segment-shaped groove base and groove walls extending at an angle to the groove base. The groove base can be substantially perpendicular to the groove walls or enclose an obtuse angle with the walls. The aperture can be, in particular, an aperture in the groove base. In this case, the entire groove base can be penetrated in the region of the aperture or only a partial area of the groove base can be penetrated. If chamfered groove walls are provided, the aperture can additionally also penetrate a section of one or both walls. The circular segment shape of the groove base can be chosen in such a way that the inner surface of the side wall forms a segment of a circle around the centre line of the measuring tube in the section of the groove base.

The aperture can connect a measuring volume, which is enclosed by the inner surface of the side wall of the measuring tube, to an exchange volume adjoining an outer surface of the side wall in order to allow fluid exchange between these volumes. In particular, it is possible in this case for the ultrasonic meter to have a sealing element, which separates the exchange volume from the fluid inlet, thus allowing fluid exchange between the fluid inlet and the exchange volume in the ultrasonic meter exclusively via the measuring tube. It is possible for a fluid volume on the fluid outlet side of the ultrasonic meter to be coupled directly to the exchange volume or to form the latter, thus allowing fluid exchange between the fluid outlet and the exchange volume within the ultrasonic meter outside the measuring tube. In particular, it is possible, on the fluid outlet side, for the measuring tube to end freely in the volume on the fluid outlet side, which forms the exchange volume.

The sealing element can be arranged on a fluid-inlet end of the measuring tube. Thus, all the fluid is forced to pass through the inlet of the measuring tube. It is not absolutely essential for parts of the flow which enter the exchange volume from the measuring tube to be returned to the measuring tube. The exchange volume can therefore be connected directly to the fluid outlet, thereby making possible a further reduction in a pressure drop across the measuring tube.

In particular, the sealing element can be formed integrally with the measuring tube. It can be made from the same material and can be produced jointly with the measuring tube, e.g. in an injection molding process. The sealing element can be configured as a collar, which extends outwards radially from the side wall of the measuring tube at a fluid-inlet end of the measuring tube.

The aperture and/or the recessed region can extend as far as an end of the measuring tube facing the fluid outlet. This is advantageous particularly in cases in which a reflection element explained at the outset is arranged in the flow path. By virtue of the aperture or the recessed region at the end of the tube, the flow can flow more easily around a corresponding reflection element. Overall, a pressure drop in the ultrasonic meter can be reduced, and sudden changes in the flow at the reflector can be reduced or avoided.

In an alternative embodiment, it is possible that the aperture and/or the recessed region are spaced apart both from an end of the measuring tube facing the fluid outlet and from an end of the measuring tube facing the fluid inlet. For example, it is possible in at least one groove to provide an aperture or recessed region which extends in the flow direction in a substantially symmetrical way with respect to a center of the measuring tube or a measuring zone formed with the aid of the measuring tube. Depending on the specific embodiment of the ultrasonic meter, this can stabilize the flow profile in regions of particular relevance for measurement.

In the case where the side wall has a plurality of grooves, which each have an aperture and/or a step, the wall thicknesses of the side wall in the region of at least two apertures and/or the dimensions of at least two apertures and/or of at least two recessed regions in the flow direction and/or circumferential direction and/or the positions of at least two apertures and/or of at least two steps relative to the respective groove and/or the heights of at least two steps can be different from one another. It is thereby possible to further disrupt symmetry of a flow profile. Symmetries of the flow profile can lead to a sudden change in the flow when there is a slight disruption of the symmetry. By a selective disruption of the symmetry, corresponding changes in flow can be prevented or reduced to a great extent, thereby enabling the robustness of measurement to be improved overall.

The wall thickness of the side wall and/or the position of the outer surface of the side wall perpendicularly to the flow direction can vary along the edge of the aperture in a section of the side wall which delimits the aperture. In particular, a corresponding variation can differ between different apertures. By means of this method too, it is possible to break symmetry of the flow profile with the advantages explained above.

Another way of breaking the symmetry of the flow profile is to adapt the groove depth of the grooves. Thus, the groove depth in various grooves can be different one from the other in an identical position when viewed in the flow direction. This applies, in particular, over the entire length of the measuring tube. If the grooves comprise groove bases and groove walls, as explained above, it is possible, in particular, for the groove bases of the various groove regions to be at different distances from a centre line of the measuring tube.

The width in the circumferential direction of the groove or of each groove and/or of the or of each recessed region and/or of the or of each aperture can increase in the direction of the fluid outlet. As already explained at the outset in relation to the grooves, it is possible for corresponding structures of the measuring tube to be contaminated and thus no longer be able to perform their function, or to do so only to a limited extent. By means of the explained widening of the corresponding structures in the direction of the fluid outlet, settling of particles can be prevented or reduced since particles can be flushed back out of these structures more easily.

The flow cross section at least in one section of the tube can decrease continuously in the direction of the fluid outlet in order to continuously increase the speed of flow of the fluid. In particular, the section is situated on the fluid inlet side of the aperture or step. In the region of the aperture or step and/or downstream thereof, i.e. in the direction of the fluid outlet, the distance between the center line of the measuring tube and the side wall in the raised regions and/or the groove regions can preferably be constant or can increase. It is thus possible for the flow cross section to be increased in the region of the aperture or step and/or to be increased on the fluid outlet side thereof by corresponding shaping of the side wall. Increasing the speed of flow of the fluid can help to further stabilize the flow and thus further improve the robustness of flow measurement.

The inner surface of the side wall in at least 30% of the circumference of the measuring tube can be formed by raised regions situated outside the groove or between the grooves. This can apply, in particular, to the entire length of the measuring tube. Preferably, at least 40%, in particular at least 50%, is formed by the raised regions. Preferably, less than 80%, in particular less than 60%, of the side wall is formed by the raised regions in the circumferential direction. The above-explained division of the circumference into raised regions and grooves makes it possible to form relatively narrow grooves which, as has been recognized in the context of the invention, are particularly advantageous for stabilization of the flow profile while, at the same time, ensuring that the grooves are wide enough to ensure that there is no clogging by dirt.

The wall thickness of the side wall can be at least 20% of the groove depth, at least in the region of the aperture. In particular, it can be at least 30% of the groove depth and preferably less than 150%, in particular less than 70%, of the groove depth. If the side wall is penetrated, the groove depth is increased by at least the wall thickness. The indicated wall thicknesses can thus be used to optimize the deepening of the grooves for a predetermined possible installation space.

The extent of the recessed region and/or of the aperture in the flow direction can be at least 5% of the length of the measuring tube. The extent in the flow direction preferably corresponds to at least 10% of the length of the measuring tube, wherein the extent is furthermore preferably less than 90%, in particular less than 70%, of the length of the measuring tube. In the indicated length ranges, the recessed region for aperture can contribute in a particularly efficient way to the stabilization of the flow profile.

On the fluid outlet side, the ultrasonic meter can have a reflection element situated at an angle to the flow direction, by means of which reflection element the ultrasound can be reflected from an ultrasonic transducer into the measuring tube or vice versa, wherein the reflection element is further away from the measuring tube in a first circumferential segment of the measuring tube than in a second circumferential segment, wherein just one groove or a plurality of grooves in the second circumferential segment has or have an aperture and/or a step. In other words, it is possible to arrange apertures and/or steps exclusively in the second circumferential segment, in which the reflection element is relatively close to the measuring tube. This is advantageous since a corresponding arrangement of the apertures or steps selectively widens the flow cross section of the measuring tube in such a way that flow through the reflection element is particularly easy, as a result of which build-ups of the fluid to be measured at the reflection element can be avoided.

The inner wall can have precisely one groove or, for example, between two and ten grooves or even more grooves.

If the inner wall has at least two grooves, at least two raised regions of the inner wall, which each extend between two of the grooves, can have different extents from one an-other in the circumferential direction. This can be advantageous in order to break a rotational symmetry or some other symmetry of the fluid flow, thereby making it possible to stabilize the flow through the measuring tube.

Apart from the grooves, the flow cross section of the measuring tube can have the shape of a circle or of an oval or of a polygon. Circular or oval measuring tubes are often chosen. In the ultrasonic meter according to the invention, however, it is also possible to choose rectangular, square, hexagonal or octagonal flow cross sections, for example. Angular flow cross sections can be used to break symmetry of a fluid flow, thereby making it possible to stabilize the fluid flow.

The variant of the ultrasonic meter according to the invention which has an aperture exclusively within the groove or grooves can be developed in such a way that, in addition, a groove wall step is provided on at least one groove wall of at least one groove and/or an inner wall step is provided outside the groove. If the groove has a groove base and groove walls at an angle thereto, it is possible for only the groove base to be penetrated, wherein the groove walls have a groove wall step in the flow direction, at which the groove width or distance between the two groove walls increases in a direction towards the fluid outlet. As a supplementary or alternative measure, the inner wall can have a side wall step outside the groove or grooves, at which step the flow cross section increases in a direction towards the fluid outlet.

The groove wall step and/or the side wall step can preferably be arranged at the same level in the flow direction as the rim of the aperture in the groove. Thus, an encircling edge of the measuring tube can be formed by the rim of the apertures together with the groove wall steps and/or the side wall steps in the circumferential direction.

Such an embodiment of the measuring tube is advantageous particularly if the measuring tube is to be produced by an injection molding process. It is possible in this case, for example, for the measuring tube to be shaped in such a way that the flow cross section of the measuring tube initially narrows in the flow direction by virtue of a conical shape of the measuring tube until the region in which the apertures begin is reached. Starting from this point, the flow cross section can widen again conically. An injection mold can thus be joined together at the surface at which the apertures begin.

At the point at which the injection molds are joined together, demolding flash is generally formed. This can be avoided in the case of the configuration according to the invention since the joining plane of the injection mold coincides with the side wall step or groove wall step, thereby making it unnecessary to produce a level wall section perpendicularly to the joining plane at the joining plane. The described embodiment of the measuring tube thus allows a simple and very stable injection molding process, wherein the widening in the flow cross section resulting from the steps can furthermore allow improved flow around a reflection element on the fluid outlet side.

Other features which are considered as characteristic for the invention are set forth in the appended claims.

Although the invention is illustrated and described herein as embodied in an ultrasonic meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
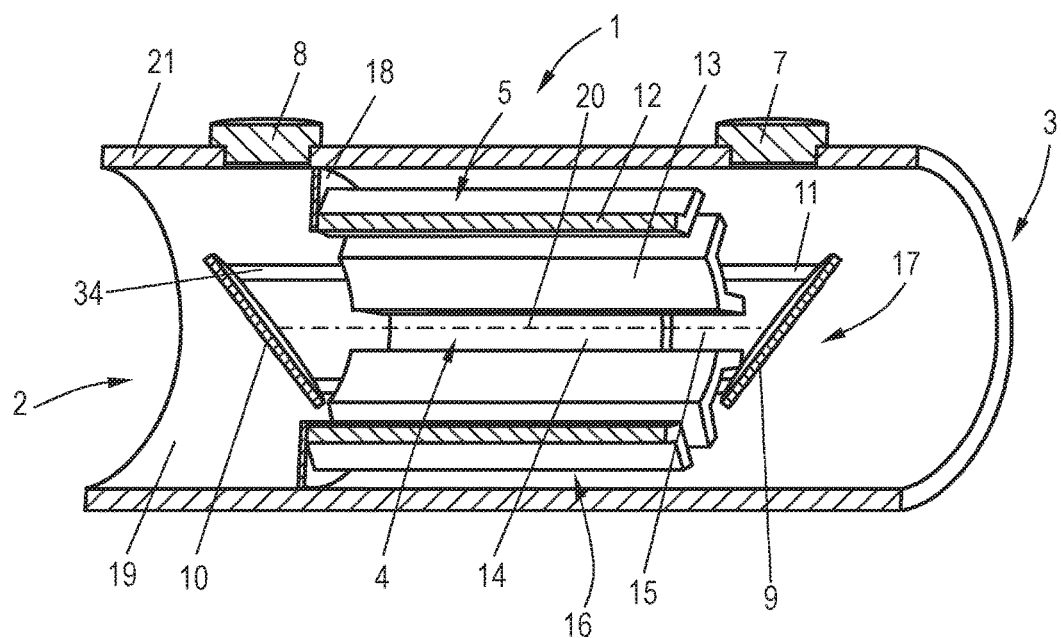
FIG. 1 is a diagrammatic, cutaway view of an ultrasonic meter according to the invention.

Referring now to the figures of the drawings in detail and first, particularly to FIG. 1 thereof, there is shown an ultrasonic meter 1 for detecting a flow rate of a fluid. The ultrasonic meter 1 has a fluid inlet 2 and a fluid outlet 3, which can be connected to a fluid network. A flow passage 4 connects the fluid inlet 2 to the fluid outlet 3. Arranged in the flow passage 4 is a measuring tube 5, which extends in a straight line in one flow direction.

To measure a flow rate, a speed of flow of a medium is determined by sending an ultrasound signal through the measuring tube 5 substantially parallel to the flow direction and evaluating a propagation time and/or a frequency shift of the ultrasound signal. This procedure is known in principle in the prior art and will not be explained in detail. Ultrasonic transducers 7, 8 for providing or receiving the ultrasound signal are arranged on a side wall of a housing 21, which forms at least sections of the flow passage 4. The ultrasound signals can be transmitted and received by the ultrasonic transducers 7, 8 approximately orthogonally to the flow direction. In order to guide the ultrasound signal within the measuring tube substantially parallel to the flow direction, reflection elements 9, 10 are therefore provided, these being held on the measuring tube 5 by holding elements 11, 34 in the example shown. As an alternative, the reflector elements 9, 10 can also be held on the housing 21.

Figure 2:
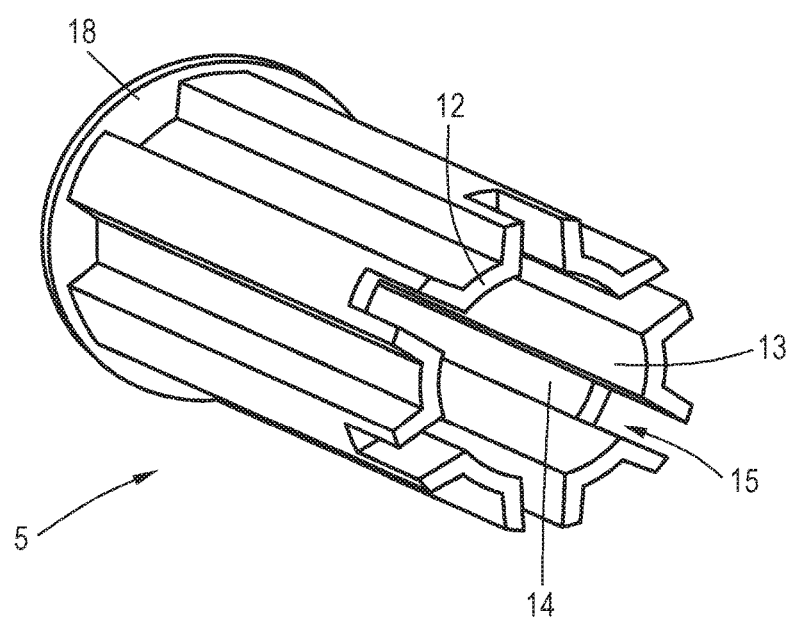
FIG. 2 is a perspective view a measuring tube used in the ultrasonic meter.
Figure 3:
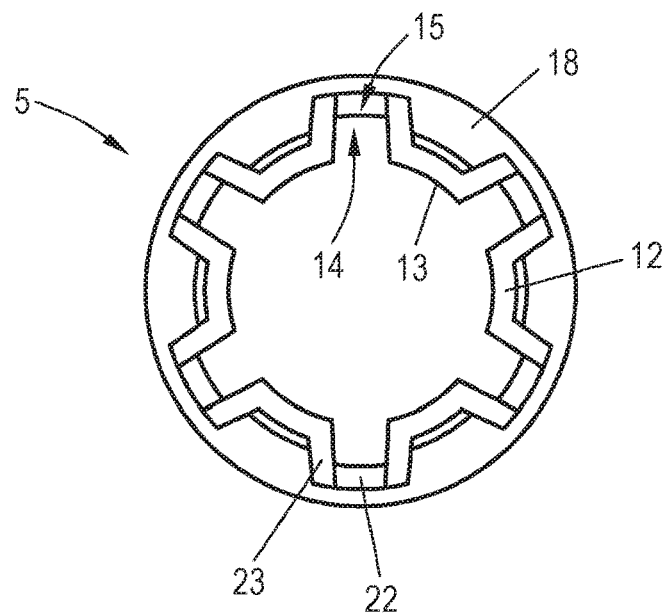
FIG. 3 is an end view of the measuring tube used.

If, in the arrangement shown, use is made of the measuring tube 5, the side wall of which is level throughout, build-ups, which can occur at the reflector elements 9, 10 at certain flow rates, for example, can lead to a sudden change in the flow in the flow passage 4. In the ultrasonic meter 1, therefore, use is made of an alternative measuring tube, which is illustrated from different perspectives in FIGS. 2 and 3. A side wall 12 of the measuring tube 5 is shaped in such a way in the circumferential direction of the measuring tube 5 that raised regions 13 and grooves 14 are formed alternately when viewed in the circumferential direction, wherein an inner surface of the side wall 12 is further away from a measuring-tube center line 20 extending in the flow direction in the grooves 14 than in the raised regions 13. In this case, the grooves 14 have a circular-segment-shaped groove base 22 and groove walls 23 that slope relative to a radial direction of the measuring tube. The profile of the inner surface is thus substantially a trapezium profile. It would also be possible to round the edges in this profile or to use an undulating profile.

In order to further increase the stability of the flow in the measuring tube 5, apertures 15 in the side wall 12 are provided exclusively in the grooves 14. The apertures 15 connect a measuring volume enclosed by the inner surface of the side wall 12 of the measuring tube 5 to an exchange volume 16 adjoining an outer surface of the measuring tube 5. As illustrated in FIG. 1, the exchange volume 16 is connected directly to a fluid volume 17 on the fluid outlet side. On the other hand, a sealing element 18, which is formed integrally with the measuring tube 5, separates the exchange volume 16 from a fluid volume 19 on the fluid inlet side. This ensures that fluid can only pass from the fluid inlet 2 to the fluid outlet 3 by passing through the measuring tube 5 in the ultrasonic transducer 1.

In an alternative embodiment of the ultrasonic transducer, it would be possible for the outer surface of the measuring tube 5 to rest flush on the housing 21, at least in the region of the aperture. In this case, an increase in the depth of the grooves 14 at the fluid-outlet end of the measuring tube 5 by the wall thickness of the side wall 12 would be achieved by the aperture.

The apertures 15 in the side wall 12 perform several functions. On the one hand, the provision of the apertures 15 has the effect that a flow cross section in the outflow region of the measuring tube 5 is enlarged. As a result, the fluid can be guided more easily past the reflector element 9, and therefore, on the one hand, a pressure drop across the ultra-sonic transducer is reduced and, on the other hand, the risk of changes in flow due to build-ups at the reflector element 9 can be reduced. On the other hand, it has been observed that the grooves 14 of the measuring tube 5 can increase the stability of the flow particularly when they are relatively deep. The provision of the apertures 15 has the effect that deeper grooves are in fact achieved. This is accomplished by a step-like transition, which can likewise contribute to stabilization of the flow. Thus, the provision of these apertures makes it possible to deepen the grooves locally without increasing the installation space requirement of the ultrasonic transducer 1.

Figure 4:
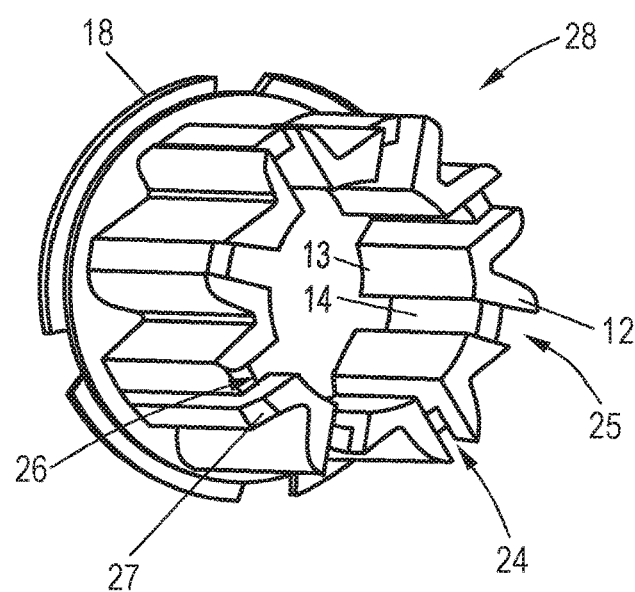
FIGS. 4-6 are perspective views of various embodiments of the measuring tube for further illustrative embodiments of the ultrasonic meter according to the invention.

FIG. 4 shows an alternative measuring tube 28, which can be used in the ultrasonic transducer 1 instead of measuring tube 5. The construction of measuring tube 28 corresponds substantially to the construction of measuring tube 5, although, in contrast to measuring tube 5, in which all the apertures 15 are of identical design, the various apertures 24, 25, 26 in measuring tube 28 are of different designs. The structure of the aperture 24 corresponds substantially to the structure of the apertures 15 in measuring tube 5. Aperture 25 differs therefrom in that the wall thickness of the side wall 12 in the region of aperture 25 is different on different sides of aperture 25, with the result that the distance of the outer surface of the side wall 12 from the center line (not shown for reasons of clarity) of measuring tube 28 differs on different sides of aperture 25. Aperture 26 differs from aperture 24 in that aperture 26 not only penetrates the groove base but also the groove wall in region 27 towards the end of measuring tube 28. Apertures 24, 25, 26 thus have different wall thicknesses of the side wall in the region of apertures 24, 25, 26 or different dimensions of apertures 24, 25, 26.

In alternative illustrative embodiments, symmetry of the flow profile could additionally or alternatively be broken by varying the position of apertures 24, 25, 26 in the flow direction and/or in the circumferential direction relative to the respective groove 14 and/or by varying the depth of the grooves 14.

Figure 5:
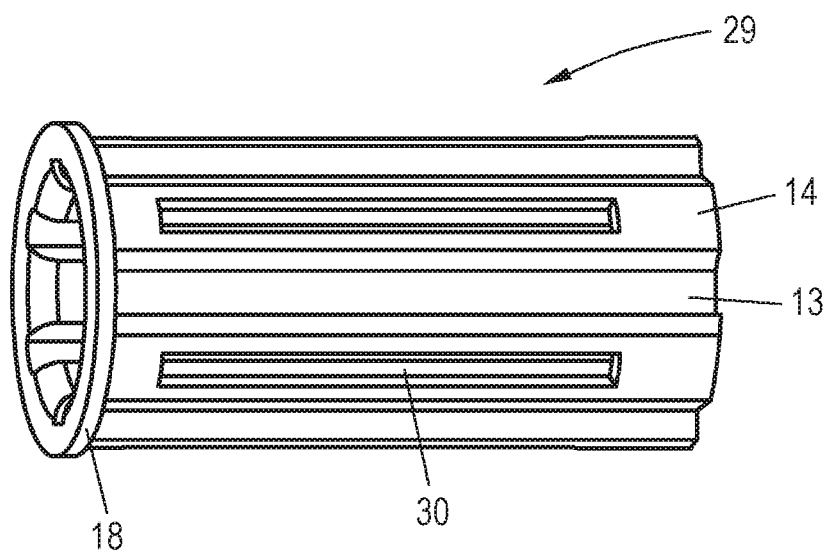

FIG. 5 shows another measuring tube 29, which could be used in the ultrasonic meter 1 as an alternative to the measuring tube 5. While apertures 15, 24, 25, 26 in measuring tubes 5, 28 each extend as far as an end of measuring tube 5, 28 facing the fluid outlet 3, the apertures 30 in measuring tube 29 are at a distance from the two ends of measuring tube 29 and are arranged centrally in the grooves 14 of measuring tube 29. Depending on the specific embodiment of the ultrasonic transducer 1, the measuring tube 29 of this kind can be advantageous for stabilizing the flow in the central region of the measuring tube. Since the compensating region 19 adjacent to the apertures 30, which is connected to the fluid volume 17 on the fluid outlet side, is separated from the fluid inlet 2 by the sealing element 18, it is ensured that all the fluid fed in via the fluid inlet 2 is also passed through the measuring tube. There is therefore no need to ensure that fluid which enters the exchange volume 16 through the apertures 30 is guided back into measuring tube 29. It is also possible for the fluid to be guided to the fluid outlet 3 along the outer surface of measuring tube 29 after emerging through aperture 30.

Figure 6:
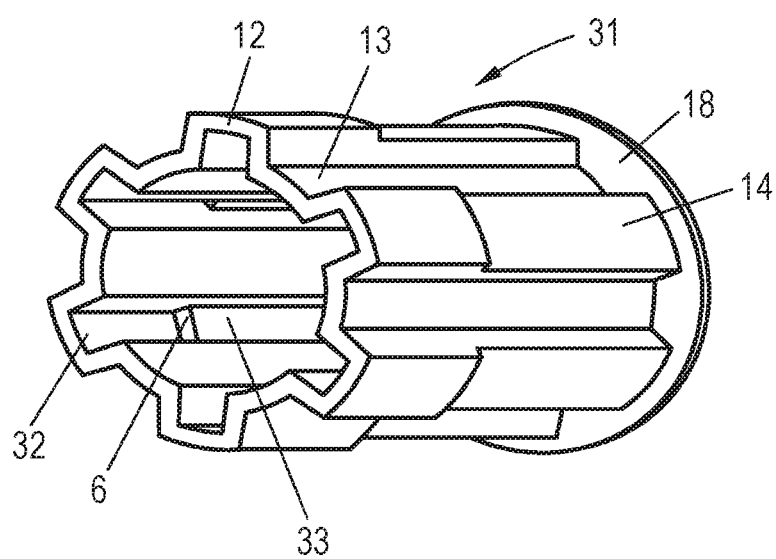

As already explained, apertures 15, 24, 25, 26, 30 in the preceding illustrative embodiments are used essentially to effectively deepen the grooves. It is thus also possible, instead of apertures 15, 24, 25, 26, 30, to use recessed regions 32 of the kind illustrated for measuring tube 31 in FIG. 6. Here, a step 6 is provided between a normal region 33 and a recessed region 32 of the respective grooves 14. The preceding explanations in respect of the possible positions and designs of the apertures can of course also be transferred to the designs of the recessed regions 32 and steps 6. For example, these can be arranged at different positions or can be of different designs in different grooves 14. Thus, the steps 6 can have different heights in order to break symmetry of a flow cross section. It is also possible to arrange the recessed regions 32 centrally in measuring tube 31, as illustrated for the apertures 30 in FIG. 5.

In the previous explanation, it was assumed that the side wall 12 of measuring tubes 5, 28, 29, 31 is formed substantially parallel to a center line of the respective measuring tube 5, 28, 29, 31 in the region of the raised regions 13. In order to further stabilize the flow in measuring tube 5, 28, 29, 31, however, it is possible to reduce the flow cross section in the direction of the fluid outlet 3, at least in a section of measuring tube 5, 28, 29, 31 situated ahead of the steps 6 and apertures 15, 24, 25, 26, 30 in the flow direction, in order to continuously increase the speed of flow. In the region of apertures 15, 24, 25, 26, 30 and the steps 6 and downstream thereof, the flow cross section can be kept constant or widened.

In order to prevent or reduce sticking of dirt in the grooves 14, apertures 15, 24, 25, 26, 30 and/or the recesses 32, it is possible for each of these to widen in the direction of the flow outlet 3.

Figure 7:
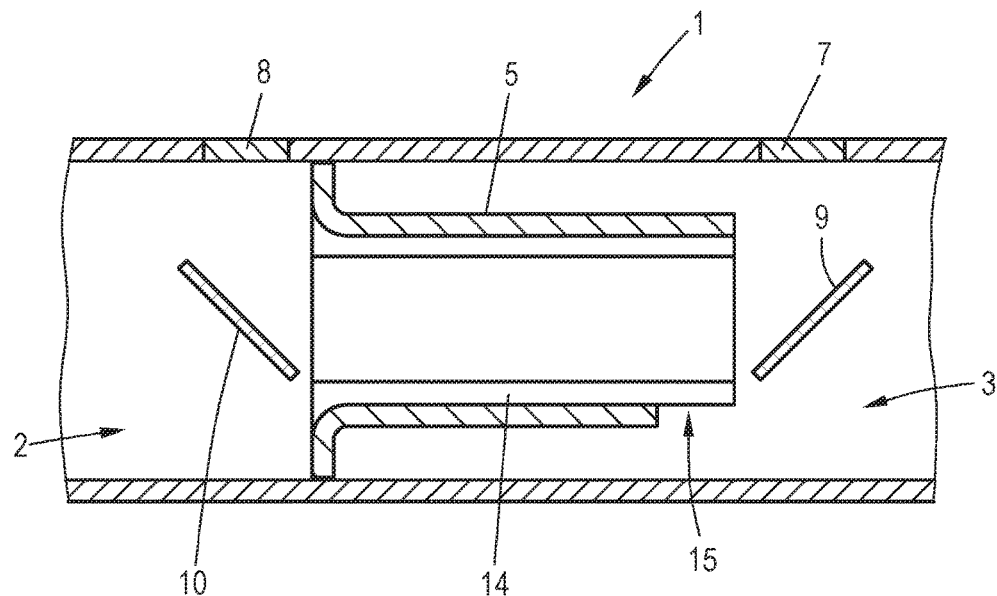
FIG. 7 is a sectional view of an embodiment of the ultrasonic meter according to the invention.

FIG. 7 shows another illustrative embodiment of the ultrasonic meter 1. The construction of the ultrasonic meter 1 corresponds substantially to the construction of the ultrasonic meter 1 shown in FIG. 1. Therefore, only the differences between these two ultrasonic meters 1 will be described below. In the ultrasonic meter 1 shown in FIG. 7, the reflection element 9, by means of which the ultrasound from an ultrasonic transducer 7 can be reflected into the measuring tube 5 or vice versa, is provided on the fluid outlet side at an angle to the flow direction. In a first circumferential segment of the measuring tube 5, the reflection element 9 is further away from the measuring tube 5 than in a second circumferential segment. In FIG. 7, the measuring tube 5 is illustrated in such a way that the first circumferential segment faces the top of the figure and the second circumferential segment faces the bottom. The measuring tube 5 has two grooves 14, namely one at the top and one at the bottom. Only the groove 14 at the bottom of the measuring tube 5, i.e. a groove 14 in the second circumferential segment, has an aperture 15. This asymmetric arrangement of the aperture makes it possible to avoid a build-up in the region in which the reflection element 9 is relatively close to measuring tube 5. Sudden changes in the flow due to build-ups can thereby be avoided.

Figure 8:
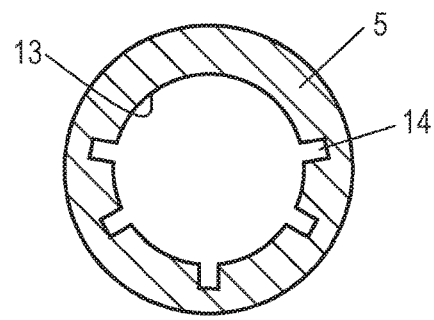
FIGS. 8 and 9 are end views of further possible ways of embodying the respective measuring tube for further illustrative embodiments of the ultrasonic meter according to the invention.
Figure 9:
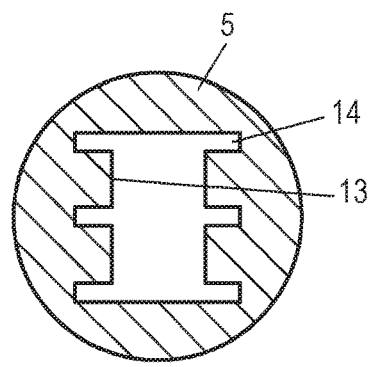

FIGS. 8 and 9 show two more illustrative embodiments of the measuring tubes 5 which can be used in ultrasonic meters according to the invention. These each show sections perpendicularly to the flow direction, more specifically in regions in which neither recessed regions nor steps nor apertures are arranged. FIGS. 8 and 9 thus show exclusively the respective flow cross section of the respective measuring tube 5 having the grooves 14 which enlarge the respective flow cross section. Apart from the grooves, the flow cross section of the measuring tube has substantially the shape of a circle in FIG. 8 and substantially the shape of a rectangle in FIG. 9.

Five grooves are provided in FIG. 8 and six grooves are provided in FIG. 9. As an alternative, it would be possible, for example, to provide just one groove or to provide up to ten grooves.

While the previous illustrative embodiments have regular groove structures, in which all the raised regions 13 between in each case two grooves 14 have the same extent in the circumferential direction, this is not the case in FIG. 8. Here, the different raised regions 13 have different extents from one another in the circumferential direction of measuring tube 5.

Figure 10:
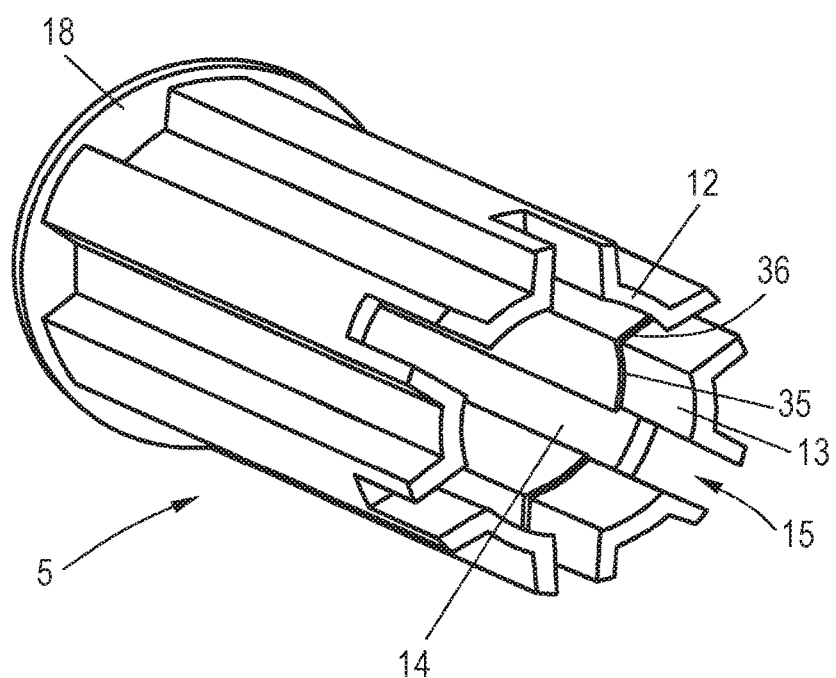
FIG. 10 is a perspective view of a further possible embodiment of the respective measuring tube for a further illustrative embodiment of the ultrasonic meter according to the invention.

FIG. 10 shows another illustrative embodiment of the measuring tube 5, which can be used in ultrasonic meters according to the invention. The fundamental construction of the measuring tube corresponds to the measuring tube shown in FIG. 2. In contrast to this measuring tube, however, side wall steps 35 and groove wall steps 36 are provided in addition to the apertures 15, at which steps the flow cross section of measuring tube 5 is additionally widened at each position in the flow direction at which the apertures 15 begin. These steps perform two functions. On the one hand, the additional widening of the flow cross section allows easier flow around a reflection element arranged on the fluid outlet side. Moreover, it is easier to produce the measuring tube 5 by injection molding methods. To stabilize the guidance of the flow, there may be a desire to initially continuously narrow the flow cross section in the flow direction upstream of the apertures 15 and to widen the cross section again from the point at which the apertures 15 begin. If the measuring tube 5 is to be produced by injection molding, it is advantageous in this case to place the joining plane of the injection mould precisely at the position at which the transition from conical narrowing to conical widening takes place, i.e. at the starting point of aperture 15. Demolding flash typically arises at the joining plane of an injection mould if level walls are to be formed perpendicularly to the joining plane of the injection mold. In the embodiment described, this is prevented by providing steps in the joining plane. The formation of corresponding demolding flash can thereby be prevented.

The following is a summary list of reference numerals and the corresponding structure used in the above description of the invention:

1 ultrasonic meter
2 fluid inlet
3 fluid outlet
4 flow passage
5 measuring tube
6 step
7 ultrasonic transducer
8 ultrasonic transducer
9 reflection element
10 reflection element
11 holding element
12 side wall
13 raised region
14 groove
15 aperture
16 exchange volume
17 fluid volume
18 sealing element
19 fluid volume
20 centre line
21 housing
22 groove base
23 groove base
24 aperture
25 aperture
26 aperture
27 region
28 measuring tube
29 measuring tube
30 aperture
31 measuring tube
32 recessed region
33 normal region
34 holding element
35 side wall step
36 groove wall step

The invention claimed is:

1. An ultrasonic meter for detecting a flow rate of a fluid, the ultrasonic meter comprising:
a fluid inlet;
a fluid outlet; and
a flow passage connecting said fluid inlet to said fluid outlet, said flow passage having a measuring tube extending in a straight line in a flow direction, said measuring tube having a side wall with an inner side delimiting a flow cross section of said measuring tube, said inner side having at least one groove formed therein and, extending in the flow direction, and enlarges said flow cross section, said side wall having an at least one of an aperture formed therein or a step exclusively within said groove, between a normal region and a recessed region in the flow direction, wherein a groove depth of said groove being greater in said recessed region than in said normal region.

2. The ultrasonic meter according to claim 1, wherein said inner side has a plurality of grooves formed therein, one of said grooves has said aperture and/or said step or wherein said plurality of grooves have a respective aperture formed therein and/or a respective step.

3. The ultrasonic meter according to claim 1, wherein said groove in each case has a level or circular-segment-shaped groove base and groove walls extending at an angle to said groove base.

4. The ultrasonic meter according to claim 1, wherein said aperture connects a measuring volume, which is enclosed by said inner side of said side wall of said measuring tube, to an exchange volume adjoining an outer surface of said side wall in order to allow fluid exchange between said measuring volume and said exchange volume.

5. The ultrasonic meter according to claim 4, further comprising a sealing element, which separates said exchange volume from said fluid inlet, thus allowing fluid exchange between said fluid inlet and said exchange volume in the ultrasonic meter exclusively via said measuring tube.

6. The ultrasonic meter according to claim 5, wherein said sealing element is formed integrally with said measuring tube.

7. The ultrasonic meter according to claim 1, wherein at least one of said aperture or said recessed region extend as far as an end of said measuring tube facing said fluid outlet.

8. The ultrasonic meter according to claim 1, wherein at least one of said aperture or said recessed region are spaced apart both from an end of said measuring tube facing said fluid outlet and from an end of said measuring tube facing said fluid inlet.

9. The ultrasonic meter according to claim 1, wherein:
said side wall has a plurality of grooves formed therein, each of said grooves having at least one of an aperture formed therein or a step; and
said side wall having a wall thicknesses in a region of at least two apertures and/or dimensions of said at least two apertures and/or of at least two recessed regions in the flow direction and/or circumferential direction and/or positions of said at least two apertures and/or of at least two steps relative to a respective groove and/or heights of said at least two steps are different from one another.

10. The ultrasonic meter according to claim 1, wherein said sidewall has a wall thickness and/or a position of an outer surface of said side wall perpendicularly to the flow direction varies along an edge of said aperture in a section of said side wall which delimits said aperture.

11. The ultrasonic meter according to claim 1, wherein said inner side has a plurality of grooves formed therein, wherein a given groove depth in various ones of said grooves is different from another one of said grooves in an identical position when viewed in the flow direction.

12. The ultrasonic meter according to claim 1, wherein a width in a circumferential direction of each said groove and/or of each said recessed region and/or of each said aperture increases in a direction of said fluid outlet.

13. The ultrasonic meter according to claim 1, wherein the flow cross section in at least one section of said measuring tube decreases continuously in a direction of said fluid outlet in order to continuously increase a speed of flow of the fluid.

14. The ultrasonic meter according to claim 1, wherein:
said groove is one of a plurality of grooves; and
said inner side of said side wall in at least 30% of a circumference of said measuring tube is formed by raised regions situated outside said groove or between said grooves.

15. The ultrasonic meter according to claim 1, wherein said side wall has a wall thickness being at least 20% of the groove depth, at least in a region of said aperture.

16. The ultrasonic meter according to claim 1, wherein an extent of at least one of said recessed region or said aperture in the flow direction is at least 5% of a length of said measuring tube.

17. The ultrasonic meter according to claim 1, further comprising:
   an ultrasonic transducer outputting an ultrasound signal; and
   a reflection element situated at an angle to the flow direction on a fluid outlet side, by means of said reflection element the ultrasound signal can be reflected from said ultrasonic transducer into said measuring tube or vice versa, wherein said reflection element is further away from said measuring tube in a first circumferential segment of said measuring tube than in a second circumferential segment, wherein just one groove or a plurality of grooves in said second circumferential segment has or have said aperture and/or said step.

18. The ultrasonic meter according to claim 1, wherein said inner side has precisely one said groove.

19. The ultrasonic meter according to claim 14, wherein:
   said inner side has at least two of said grooves; and
   at least two said raised regions of said inner wall, which each extend between two of said grooves, have different extents from one another in a circumferential direction.

20. The ultrasonic meter according to claim 1, wherein said flow cross section of said measuring tube has a shape of a circle, an oval or a polygon, apart from said groove.

21. The ultrasonic meter according to claim 1, wherein said inner side has between two and ten grooves.

* * * * *